United States Patent
Maresca

[11] Patent Number: 6,137,844
[45] Date of Patent: Oct. 24, 2000

[54] DIGITAL FILTER FOR NOISE AND ERROR REMOVAL IN TRANSMITTED ANALOG SIGNALS

[75] Inventor: Patrick A. Maresca, Dunwoody, Ga.

[73] Assignee: Oki Telecom, Inc., Suwanee, Ga.

[21] Appl. No.: 09/050,601

[22] Filed: Mar. 30, 1998

Related U.S. Application Data

[60] Provisional application No. 60/073,466, Feb. 2, 1998.

[51] Int. Cl.[7] ................................................ H03D 1/00
[52] U.S. Cl. ............................................ 375/340; 375/355
[58] Field of Search ................................. 375/340, 324, 375/355, 293, 292, 354; 714/800, 801, 760, 775

[56] References Cited

U.S. PATENT DOCUMENTS

| | | | |
|---|---|---|---|
| 4,025,721 | 5/1977 | Graupe et al. | 179/1 P |
| 4,025,853 | 5/1977 | Addeo | 325/55 |
| 4,185,168 | 1/1980 | Graupe et al. | 179/1 P |
| 4,493,080 | 1/1985 | Campbell | 371/37 |
| 4,630,283 | 12/1986 | Schiff | 375/1 |
| 4,672,637 | 6/1987 | Halpern et al. | 375/96 |
| 4,796,260 | 1/1989 | Schilling et al. | 371/39 |
| 4,829,543 | 5/1989 | Borth et al. | 375/83 |
| 4,847,869 | 7/1989 | Labedz et al. | 375/85 |
| 4,849,974 | 7/1989 | Schilling et al. | 371/37 |
| 4,849,976 | 7/1989 | Schilling et al. | 371/39 |
| 5,001,445 | 3/1991 | Horvath et al. | 333/166 |
| 5,247,470 | 9/1993 | McKown et al. | 364/24.11 |
| 5,323,425 | 6/1994 | Colamonico et al. | 375/98 |
| 5,390,207 | 2/1995 | Fenton et al. | 275/1 |
| 5,426,392 | 6/1995 | Kornfeld | 327/551 |
| 5,428,631 | 6/1995 | Zejavo | 371/43 |
| 5,481,553 | 1/1996 | Suzuki et al. | 714/800 |
| 5,495,499 | 2/1996 | Fenton et al. | 370/479 |
| 5,559,881 | 9/1996 | Sih | 379/410 |
| 5,598,086 | 1/1997 | Somerville | 320/30 |
| 5,646,991 | 7/1997 | Sih | 379/410 |
| 5,673,130 | 9/1997 | Sundstrom et al. | 359/158 |
| 5,675,644 | 10/1997 | Sih | 379/410 |
| 5,697,081 | 12/1997 | Lyall, Jr. et al. | 455/249.1 |
| 5,742,135 | 4/1998 | Horst | 375/354 |
| 5,815,217 | 9/1998 | Kumazawa et al. | 348/700 |
| 5,815,634 | 9/1998 | Daum et al. | 386/96 |
| 5,938,790 | 8/1999 | Marrow | 714/795 |
| 5,956,429 | 9/1999 | Burns | 382/245 |

FOREIGN PATENT DOCUMENTS

WO 91/06093  5/1991  WIPO.

OTHER PUBLICATIONS

Fading Channel communications; 1/80; Peter Monsen, IEEE Communications Society Magazine, vol. 18, No. 1, pp. 27–36.

Soft Interference Cancellation in Multiuser Communications; Vieri Vanghi & Branimir Vojcic; 1996; Wireless Personal Communications 2: pp. 111–128.

*Primary Examiner*—Chi H. Pham
*Assistant Examiner*—Emmanuel Bayard
*Attorney, Agent, or Firm*—Thomas, Kayden, Horstemeyer, & Risley, LLP

[57] ABSTRACT

A bit of a data signal is encoded with a value of a transmission clock signal if the bit corresponds to a zero. If the bit corresponds to a one, then the bit is encoded with an inverse of the value of the transmission clock signal. After transmission, the encoded signal is decoded by a counter and a comparator. The counter samples the encoded bit of the data signal into a plurality of sampled signals and inverts a portion of the sampled signals. The counter counts the number of sampled signals corresponding to a particular value such as a one or zero. When most of the sampled signals correspond to the particular value, a comparator outputs a decoded signal having a value corresponding to the particular value. When most of the sampled signals do not correspond to the particular value, the comparator outputs a decoded signal having a value corresponding to an inverse of the particular value. The number of sampled signals counted indicates the probability that the decoded signal matches the encoded signal and can be used to determine the integrity of the decoding system.

36 Claims, 5 Drawing Sheets

DIGITAL FILTER FOR NOISE AND ERROR REMOVAL IN TRANSMITTED ANALOG SIGNALS

CROSS-REFERENCE TO RELATED APPLICATION

This application claims priority under 35 U.S.C. § 119 to U.S. Provisional Patent Application Ser. No. 60/073,466, filed Feb. 2, 1998.

BACKGROUND OF THE INVENTION

The present invention relates generally to the field of wireless communications, and more specifically, to the field of noise and error removal from signals which are transmitted in an analog form and processed in digital form.

In wireless communications, data signals are typically transmitted through the air in an analog format, even if the signals were originally in a digital format. When a signal is transmitted, the signal can suffer interference from other signals being broadcast through the air, it can be blocked and/or reflected by large buildings and large natural objects, it can be subject to fading caused by moving objects temporarily blocking the transmission path between the source and the destination, etc. As a result from the above listed and other possible sources of interference, the analog signal as it arrives at the destination often includes noise and phase angle errors.

A typical method for removing injected noise and error from an analog signal and to convert it from analog mode back to digital mode is to simply pass the analog signal as it is received through a comparator, which will compare the analog signal against at least one decision threshold and, depending on the result of the comparison, will produce one of at least two output values. In typical applications where the analog signal is a simple representation of a binary signal, the comparator will have only one decision threshold. If the analog signal exceeds the threshold or thresholds, then the comparator will output a certain voltage value and if the analog signal is below the threshold or thresholds, then the comparator will output a different voltage value. While this method provides a quick and easy method for removing noise and error from the analog signal in addition to providing the conversion from analog to digital, it provides no information as to the probability that the received signal actually matches the original analog signal. Additionally, if the analog signal undergoes severe fading which results in the received signal dropping below the threshold level of the comparator, the output voltage of the comparator may be different from the transmitted analog signal.

There is, therefore, a need in the industry for a system addressing these and other related and unrelated problems.

SUMMARY OF THE INVENTION

A system for removing injected noise and error from an analog signal includes a comparator for converting a received analog signal into its digital representation, a digital signal sampler for converting the digital signal into discrete signal values, an inverter for inverting the values of the first half of the sampled digital signal, a counter for counting the values of the sampled digital signal, and a second comparator for comparing the value of the counter with a predetermined quality value.

According to the first preferred embodiment of the present invention, the analog signal as it is received at a wireless station is transmitted to the first comparator where it is compared against a voltage threshold and converted to a digital signal. After conversion into the digital domain, the digital data is sampled at a rate sufficient to ensure the recovery of the sampled signal.

According to the first preferred embodiment of the present invention, after sampling, the first half of the sampled data representing a single data period is inverted.

According to the first preferred embodiment of the present invention, the sampled data, after inversion, is added together in the counter with the result of the summation being transmitted to the second comparator.

According to the first preferred embodiment of the present invention, the second comparator compares the result of the addition with a predetermined threshold and makes a decision on the value of the analog signal as it was originally transmitted.

According to the first preferred embodiment of the present invention, the result of the summation is also used to generate a metric of the confidence that the noise and error removal circuit has in the output value.

The present invention thus provides a system for rapid removal of noise and errors from an analog signal and provides a confidence value for the accuracy of a regenerated signal.

Objects, features, and advantages of the present invention will become apparent upon reading and understanding the present invention, when taken in conjunction with accompanying drawings.

DESCRIPTION OF THE PREFERRED EMBODIMENTS

Figure 1:
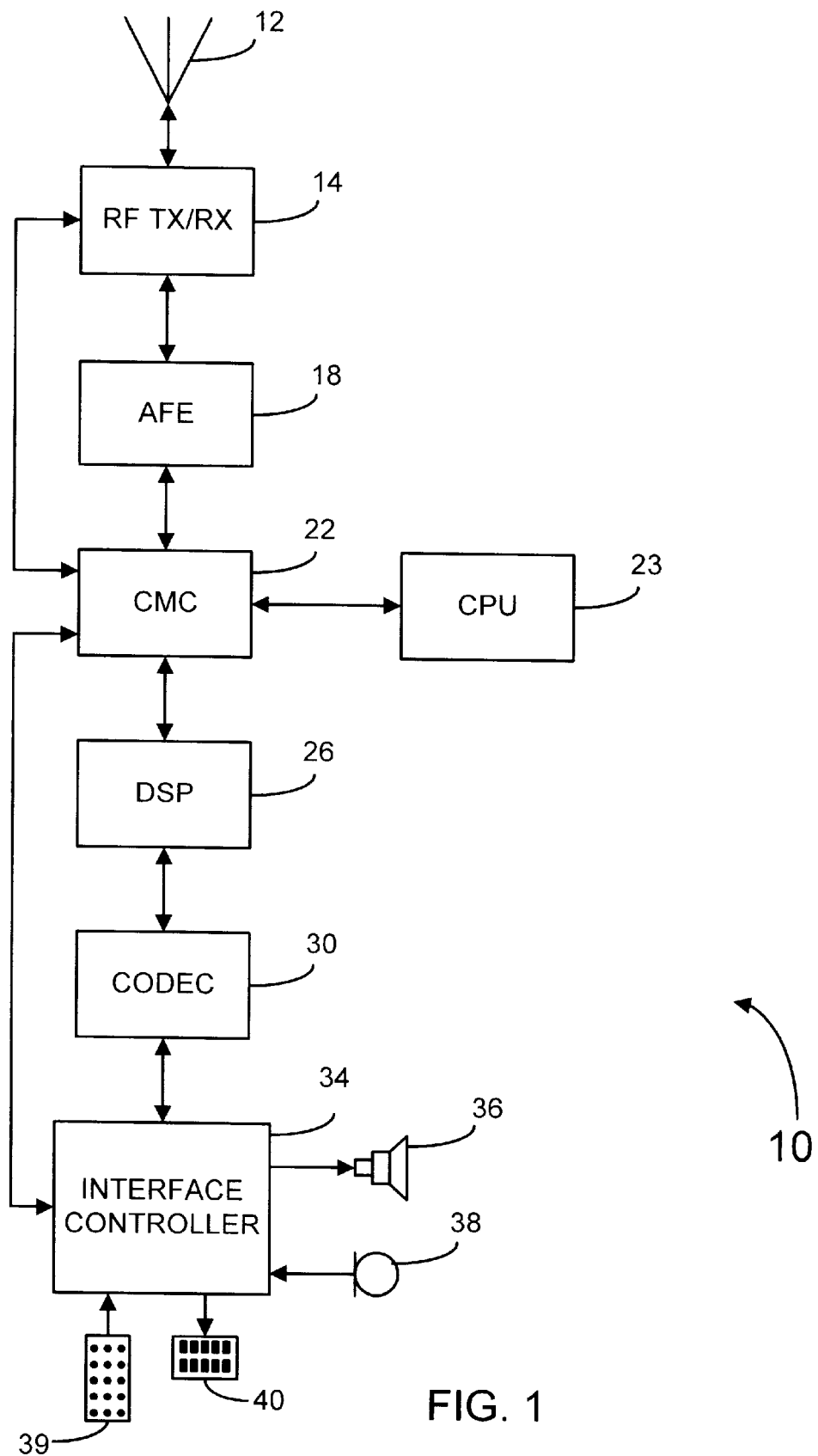
FIG. 1 is a block diagram representation of a CDMA wireless telephone, in accordance with a first preferred embodiment of the present invention.

Refer now to greater detail to the drawings in which like numerals represent like components throughout several views, FIG. 1 shows a block diagram of a dual mode wireless telephone (capable of operating in both digital and analog modes) 10 in accordance with a first preferred embodiment of the present invention. The diagram additionally applies to a variety of wireless telephones of alternate embodiments of the present invention, including dual mode cellular and PCS telephones. While the wireless telephone 10 is capable of operating in both digital and analog modes, the following description will describe the wireless telephone 10 as it operates in analog mode. According to the first preferred embodiment of the present invention, radio signals are received through an antenna 12 and then filtered, mixed to lower frequencies, automatic gain controlled, frequency modulation (FM) demodulated in a radio frequency transmit/receive (RF TX/RX) circuit 14 before being converted, in an analog front end (AFE) circuit 18, from analog to digital and supplied to a CDMA modem circuit (CMC) 22. As controlled by a central processing unit (CPU) 23, the CMC 22 demodulates the incoming digital data stream and transmits the data to a digital signal processor (DSP) 26 where the digital data is filtered. After filtering, the digital data is sent to a coder/decoder (CODEC) 30 where the digital data is decoded into an audio signal which is controllably amplified by an interface controller 34 and output through a telephone speaker 36. Likewise, a reverse path is followed through the wireless telephone 10 as a telephone microphone 38 detects user speech. A keypad 39 and a display 40 provide conventional user input and output.

Figure 2:
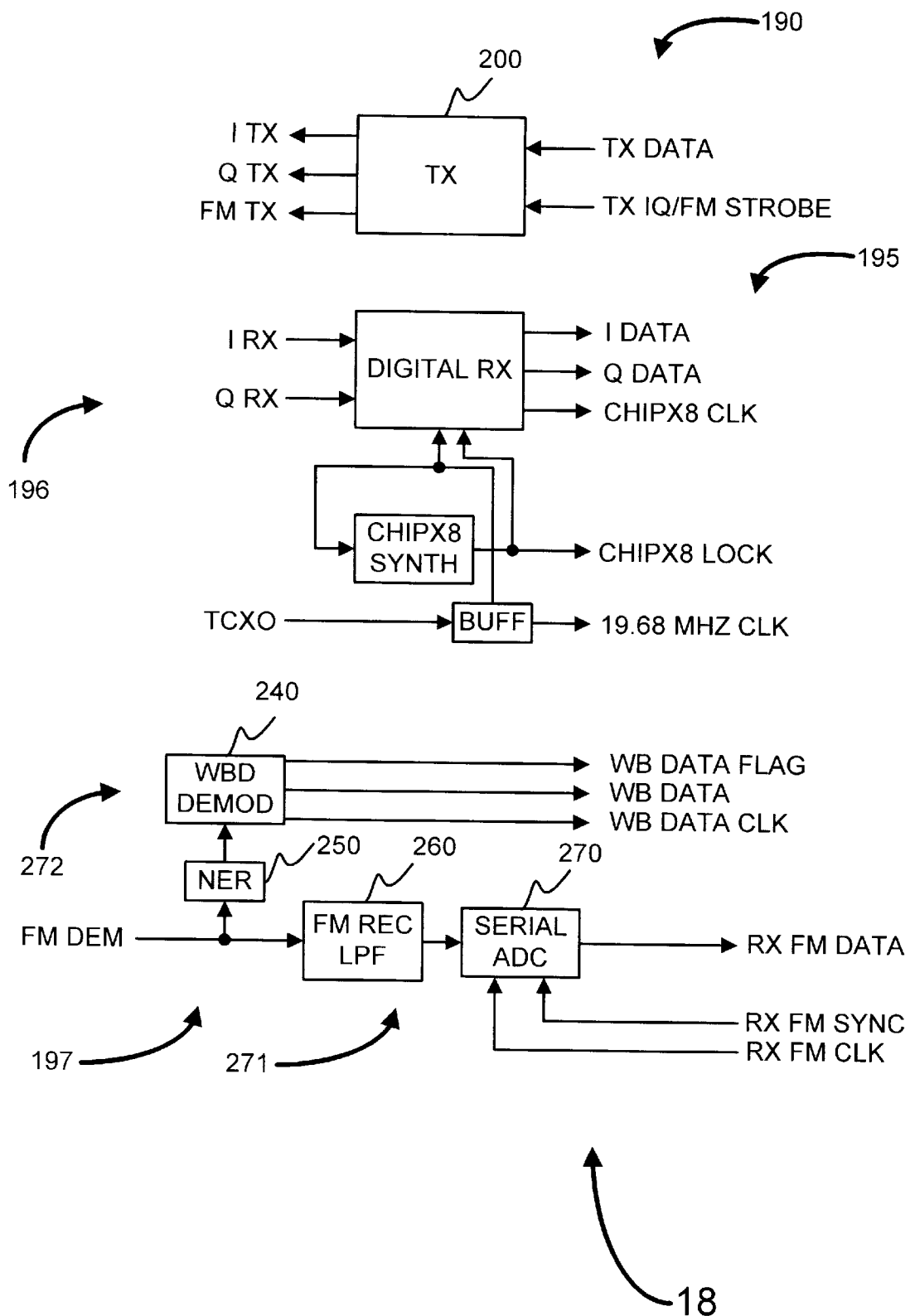
FIG. 2 is a block diagram representation of an analog front end (AFE) circuit of FIG. 1, in accordance with the first preferred embodiment of the present invention.

Refer now to FIG. 2 which shows a block diagram of the analog front end (AFE) circuit 18 of FIG. 1. The organization of the AFE 18 is divided into three sections: a transmit section 190, a receive section 195, and a auxiliary section (not shown). The auxiliary section provides basic housekeeping functionality, generates error and control flags based on the data being processed by the AFE 18 (FIG. 1), possesses power supply and control circuits, and controls the functions of the AFE 18 (FIG. 1). The transmit section 190 is responsible for performing the transformations required to prepare the output signals for transmission.

The transmit section 190 can work with both analog and digital signals, depending on the operating mode of the wireless telephone 10 (FIG. 1). The transmit section includes several low pass filters (LPF) (not shown), a data latch (not shown), several buffers (not shown), and several digital to analog converters (DAC) (not shown) in a transmitter 200. Inputs to the transmitter 200 include a transmit data stream (TX DATA) and a transmit strobe (TX IQ/FM STROBE). The TX IQ/FM STROBE is used to provide a clock for the DACs (not shown) and the data latch (not shown) in the transmitter 200. After analog TX DATA has been converted to digital TX DATA by the DACs (not shown) in the transmitter 200, the digital TX DATA is passed through a LPF (not shown) and then to the RF TX/RX 14 (FIG. 1) and the antenna 12 (FIG. 1).

The receive section 195 of the AFE 18 is divided into a digital section 196 and an analog section 197. The digital section 196 is responsible for converting the received digital signals into a form that is suitable for processing by the CMC 22 (FIG. 1) and is not discussed in this specification. The analog section 197 takes demodulated analog signals (FM DEM) from the RF TX/RX 14 (FIG. 1) and decodes the voice data signal and the wideband data signal. Inputs to the analog section 197 include FM DEM from the RF TX/RX 14 (FIG. 1) and RX FM SYNC and RX FM CLK, both from the CMC 22 (FIG. 1). The FM DEM is the demodulated FM signal, coming from the RF TX/RX circuit 14 (FIG. 1), as received from the antenna 12 (FIG. 1) of the wireless telephone 10 (FIG. 1). The RX FM SYNC is used as an input strobe signal to initiate a serial analog to digital converter (ADC) 270 conversion cycle. The RX FM CLK is used as an input clock signal to clock FM receive data out of the serial ADC 270.

As the FM DEM signal enters the analog section 197, the signal is separated into two different signal streams, the voice data signal and the wideband data signal streams. The voice data signal goes to the voice signal section 271 and the wideband data signal goes to the wideband data demodulator section 272. The voice data signal going to the voice signal section is simply filtered by a low pass filter 260 and then converted to a digital signal by the serial ADC 270. As controlled by the RX FM SYNC signal, the output of the serial ADC 270 is transmitted to the CMC 22 (FIG. 1) for further processing of the voice data signal.

The wideband data signal as it enters the wideband data demodulator section 272 is converted into digital format. In the digital conversion process, noise or errors injected into the wideband data signal during the transmission and reception process is removed. Noise and other errors introduced into the wideband data signal are removed by the noise and error removal circuit (NER) 250. After any noise and errors are removed, the digital wideband data signal enters a wideband data demodulator 240. The wideband data demodulator 240 processes the digital wideband data signal and produces as output processed wideband data (WB DATA), a flag (WB DATA FLAG) concerning the validity of the WB DATA, and a clock (WB DATA CLK). The WB DATA is the actual wideband data that was transmitted along with the voice data signal. The WB DATA FLAG is a flag that specifies if the WB DATA is valid and the WB DATA CLK provides timing information regarding the data boundaries of the WB DATA.

Figure 3:
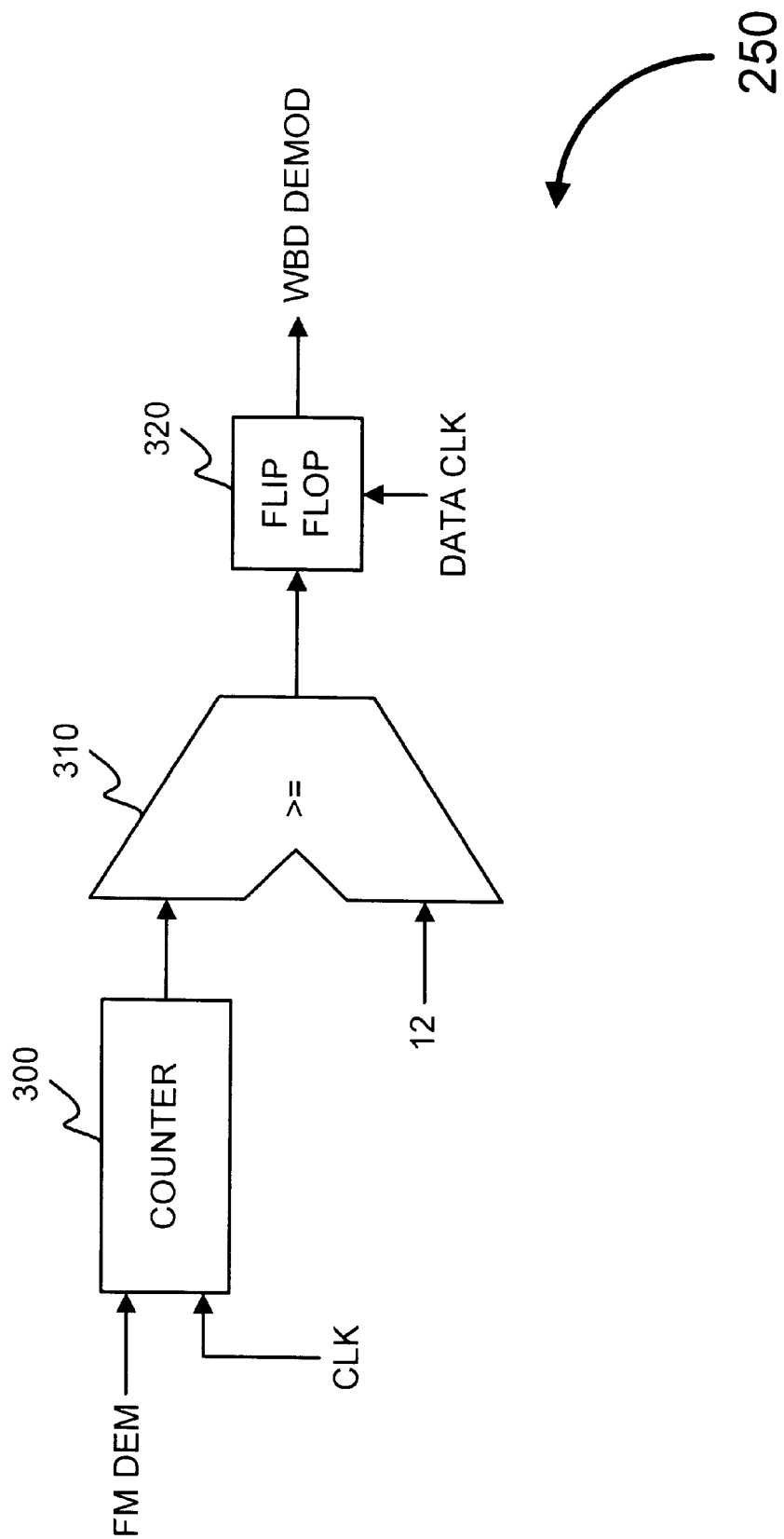
FIG. 3 is a block diagram representation of a noise and error removal (NER) circuit of FIG. 2, in accordance with the first preferred embodiment of the present invention.

Refer now to FIG. 3 for a detailed block diagram of the noise and error removal (NER) circuit 250 (FIG. 2). As the wideband data signal portion from the FM DEM signal enters a counter 300. In the preferred embodiment, counter 300 is a 5 bit counter although counters having other bit lengths are also possible. The value of the data is sampled in counter 300 at a rate that is controlled by a CLK input to the counter 300. The data sampling rate is at a rate sufficient to properly allow the proper reconstruction of the wideband data signal. Additionally, the first half of the data samples from every data period is inverted. The inversion preferably takes place in the counter 300. In the preferred embodiment of the present invention, each data period is sampled 24 times, with the first 12 data samples being inverted. Each data samples has a particular value of either a binary one (1) or a binary zero (0). The values of the data samples are added up by the counter 300, and after one complete data period (or the 24th data sample), the counter 300 outputs its value to a comparator 310. It should be noted that the same output value can be reached by counting the number of samples having a value of a binary one (1).

The comparator 310 compares the output of the counter 300 with a predetermined threshold value. In the first preferred embodiment of the present invention, the predetermined value is 12. If the output of the counter 300 is greater than or equal to 12, the comparator 310 produces a binary one (1) as output, and if the output of the counter 300 is less than 12, the comparator 310 produces a binary zero (0) as output. The output of the comparator 310 is stored in a flip flop 320 which is controlled by a data clock with the output of the flip flop 320 being transmitted to the wideband data demodulator 240 (FIG. 2).

Additionally, the output of the counter 300 is also used as a quality indicator of the data being stored in the flip flop 320. If the value from the counter 300 is close to 0 or 24, then the confidence in the accuracy of the value stored in the flip flop 320 is very high. While the closer the value in the counter 300 is to 12, the confidence in the value in the flip flop 320 is correspondingly lower. The state of the WB DATA FLAG is dependent on the values being counted in the counter 300.

Figure 4:
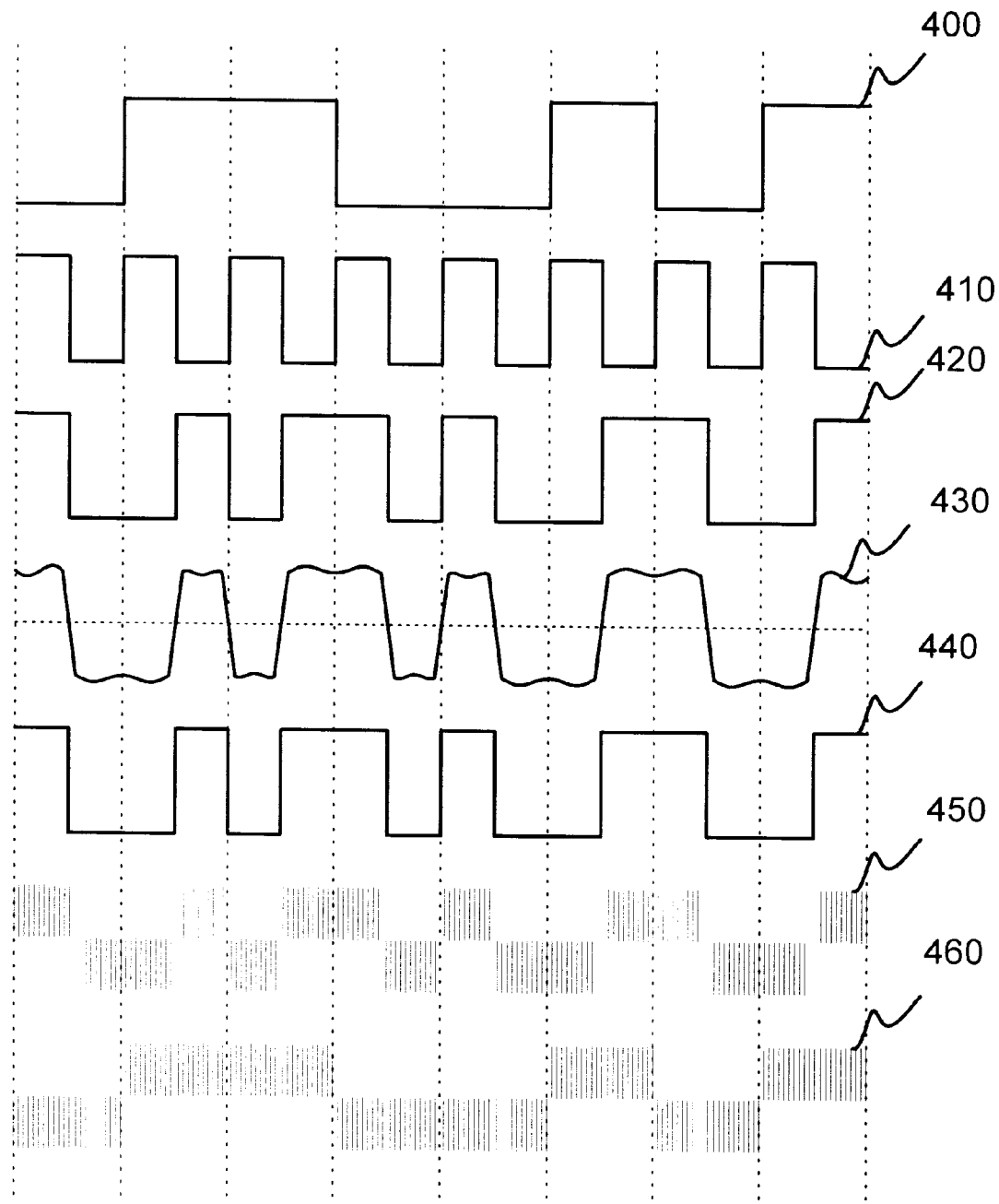
FIG. 4 is a diagram displaying the data stream as it is transmitted by the source and reconstructed at the destination by the wireless telephone of FIG. 1 and more specifically the NER circuit of FIG. 3, according to the first preferred embodiment of the present invention.

Refer now to FIG. 4 for a diagram of a data stream in the various stages of encoding, transmission, reception, and processing, according to the first preferred embodiment of the present invention. A trace 400 displays the original data stream before it is encoded or transmitted by the source. A trace 410 displays the transmission clock, which is typically operating at twice the frequency of the data stream. A trace 420 displays the encoded data stream. The data stream 400 is encoded in the following manner. If the data value is zero (0), then the encoded data value is the same as the transmission clock. If the data value is one (1), then the encoded data value is the inverse of the transmission clock. A trace 430 displays the encoded data stream after it is converted to an analog format before it is transmitted. A similar trace may be used to display the data stream as it is received at the wireless telephone 10 (FIG. 1). After being received at the wireless telephone 10 (FIG. 1), the analog data stream 430 is converted into its digital representation with a typical trace is shown in trace 440. Trace 450 displays the digital data stream 440 after it has been sampled at a rate of 24 samples per data period while trace 460 displays the digital data stream 440 after the first half of the data period has been inverted. With the data period clock of the wireless telephone 10 (FIG. 1) matching the data period clock of the transmitter, the sampled data stream with the first half of the data samples within a data period being inverted matches the original data stream before any processing.

Figure 5:
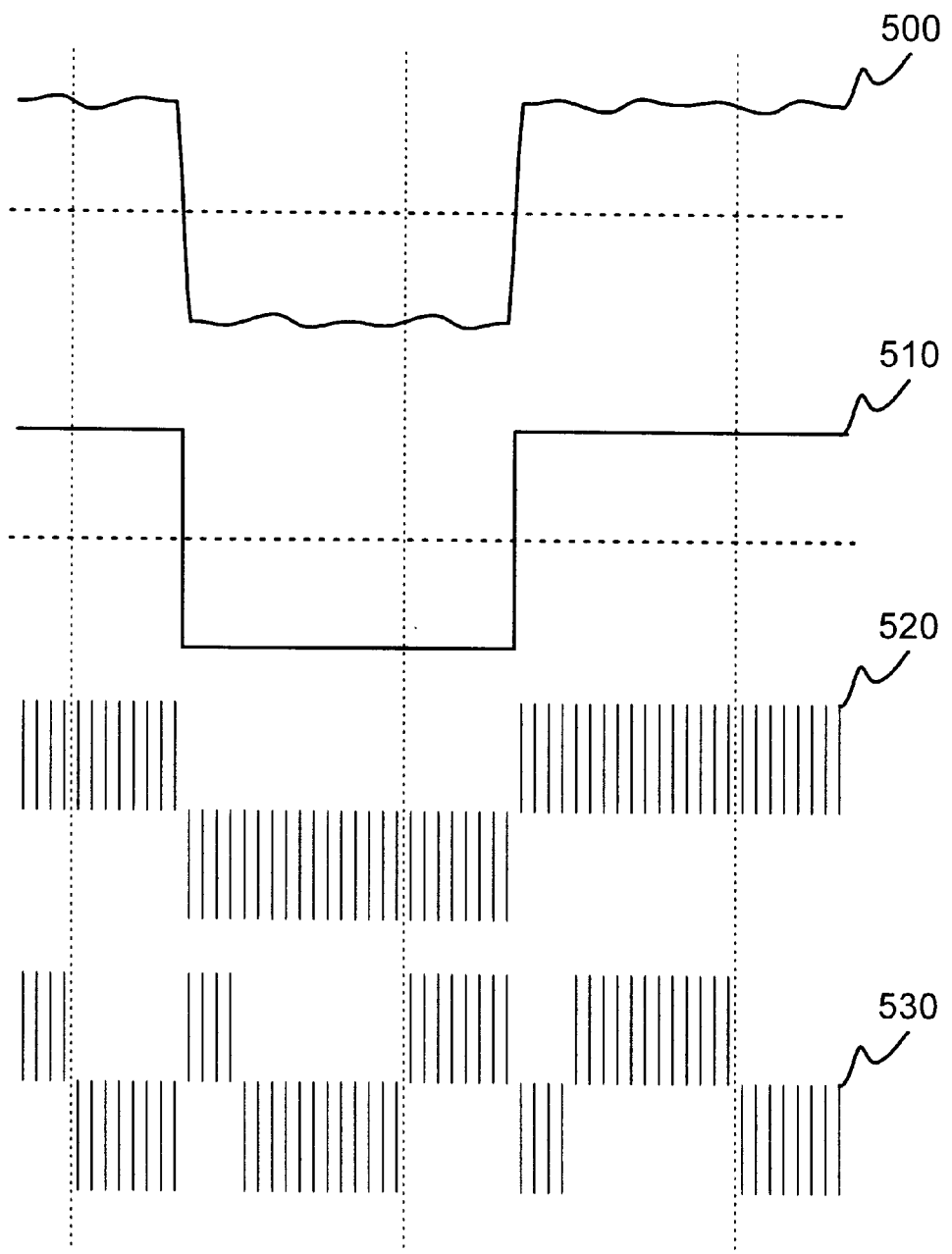
FIG. 5 is a diagram displaying the data stream that is incorrectly aligned with the data period at the receiving side of the transmission, according to the first preferred embodiment of the present invention.

Refer now to FIG. 5 for a diagram showing the decoding of a wideband data signal when the data period clock of the wireless telephone 10 (FIG. 1) is not aligned with the data period clock of the transmitter. A trace 500 displays a data stream as it is received at the wireless telephone 10 (FIG. 1). A trace 510 displays the data stream 500 after it has been converted to digital format and a trace 520 displays the same digital signal after it has been sampled at a rate of twenty four (24) samples per data period. A trace 530 displays the same sampled data trace 520 after the first twelve (12) samples per data period is inverted, according to the preferred embodiment of the present invention. Due to the misalignment of the actual data period at the transmitter and the data period of the wireless telephone 10 (FIG. 1), the count of the data samples for the first complete data period is 4 and 20 for the second. Since the count is not exactly zero (0) or twenty four (24), the certainty produced by the NER 250 (FIG. 3) is not as high as if the actual data period and the data period of the wireless telephone 10 (FIG. 1) were aligned. As a result data period clock misalignment, data which was properly transmitted becomes data which is less than certain value.

The value output by the NER is used by WBD DEMOD 240 to generate the WB DATA FLAG. This data flag may then be used by other circuitry or system components in various intelligent or logical decisions, with regard to how the data is treated.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are hereby described to include any structure, material, or acts for performing the claimed functions in combination with other claimed elements as specifically claimed.

I claim:

1. A method of decoding an encoded data signal, comprising the steps of:
    sampling said encoded data signal into a plurality of sampled signals;
    inverting a portion of said sampled signals;
    determining a number of said sampled signals having a particular value; and
    comparing said number to a threshold value in order to determine a decoded value,
    wherein said encoded data signal corresponds to one bit of a received data signal.

2. The method of claim 1, wherein said comparing step further includes the steps of:
    assigning a first value to said decoded value when said number exceeds said threshold value; and
    assigning a second value to said decoded value when said number is less than said threshold value.

3. The method of claim 1, wherein said decoded value matches said particular value when said number of said sampled signals exceeds said threshold value.

4. The method of claim 1, wherein said decoded value corresponds to an inverse of said particular value when said number of said sampled signals does not exceed said threshold value.

5. The method of claim 1, wherein said particular value is a binary one.

6. The method of claim 1, wherein said threshold value corresponds to a number representing approximately one-half of said sampled signals.

7. The system of claim 1, wherein said number indicates a probability that said decoded value matches a value of a data signal wherein said data signal corresponds to said encoded data signal.

8. The method of claim 1, wherein said portion of said sampled signals corresponds to approximately one-half of said sampled signals.

9. The method of claim 1, further comprising the step of determining a confidence level of said decoded signal based on said number of sampled signals having said particular value.

10. The method of claim 1, further comprising the steps of:
    generating a transmission clock signal;
    encoding a data signal with a value of said transmission clock signal when said transmit data signal corresponds to a second particular value; and
    encoding said transmit signal with an inverse of said value of said transmission clock signal when said data signal does not correspond to said second particular value,
    wherein said data signal corresponds to said encoded data signal.

11. The method of claim 10, wherein said second particular value matches said particular value.

12. A system for decoding an encoded data signal, comprising:
    a counter configured to sample an encoded data signal, to invert samples of said encoded data signal, and to output a count signal indicating a number of samples having a particular value; and
    a comparator configured to output a first decoded signal having a first decoded value when said number exceeds a threshold number and to output a second decoded signal having a second decoded value when said number is less than said threshold number.

13. The system of claim 11, wherein said second decoded value is an inverse of said first decoded value.

14. The system of claim 11, wherein said count signal indicates a probability that said decoded signal accurately corresponds to said encoded signal.

15. The system of claim 11, further comprising:
a clock configured to generate a transmit clock signal;
an encoder configured to encode a data signal into said encoded data signal having an encoded value, wherein said encoded value corresponds to a value of said transmit clock signal when said data signal corresponds to a second particular value and wherein said encoded value corresponds to an inverse of said value of said transmit clock signal when said transmit data signal does not correspond to said second particular value; and
a transmitter configured to transmit said encoded data signal.

16. A method of encoding a data signal, comprising the steps of:
generating a transmission clock signal;
encoding said data signal into an encoded signal having a value of said transmission clock signal when said value of said data signal corresponds to a particular value;
encoding said data signal into an encoded signal having a value corresponding to an inverse of said value of said transmission clock signal when said value of said data signal does not correspond to said particular value; and
transmitting said encoded signal.

17. The method of claim 15, wherein said particular value corresponds to a binary one.

18. A system for decoding an encoded data signal, comprising:
means for sampling said encoded data signal into a plurality of sampled signals;
means for inverting a portion of said sampled signals;
means for determining a number of said sampled signals having a particular value; and
means for comparing said number to a threshold value in order to determine a decoded value,
wherein said encoded data signal corresponds to one bit of a received data signal.

19. The system of claim 17, wherein said means for comparing further comprises:
means for assigning a first value to said decoded value when said number exceeds said threshold value; and
means for assigning a second value to said decoded value when said number is less than said threshold value.

20. The system of claim 17, wherein said number indicates a probability that said decoded value matches a value of a data signal corresponding with said encoded data signal.

21. The system of claim 17, wherein said decoded value matches said particular value when said number of said sampled signals exceeds said threshold value.

22. The system of claim 17, wherein said decoded value corresponds to an inverse of said particular value when said number of said sampled signals does not exceed said threshold value.

23. The system of claim 17, wherein said portion of said sampled signals corresponds to approximately half of said sampled signals.

24. The system of claim 17, further comprising a means for determining a confidence level of said decoded signal based on said number of sampled signals having said particular value.

25. The system of claim 17, further comprising:
means for generating a transmission clock signal;
means for encoding a data signal with a value of said transmission clock signal when said data signal corresponds to a second particular value; and
means for encoding said transmit signal with an inverse of said value of said transmission clock signal when said data signal does not correspond to said second particular value,
wherein said data signal corresponds to said encoded data signal.

26. A system for decoding a bit of an encoded data signal, comprising:
a counter responsive to said bit of said encoded data signal for sampling said bit, said counter configured to invert a particular number of samples from said bit and to generate a count signal corresponding to a second number of said samples having a particular value; and
a comparator responsive to said count signal for comparing said count signal to a threshold value and for generating a decoded signal having a value based on a comparison of said count signal to said threshold value.

27. The system of claim 25, wherein said value of said decoded signal is a logical high when a majority of said samples of said encoded data signal correspond to said logical high and said value of said decoded signal is a logical low when said majority of said samples correspond to said logical low.

28. The system of claim 25, further comprising an encoder configured to encode a bit of a data signal with a transmission clock value when said bit of said data signal matches a particular logical value and to encode said bit of said data signal with an inverse of said transmission clock value when said bit of said data signal does not match said particular logical value.

29. A method of decoding a bit of an encoded data signal, comprising the steps of:
receiving said bit of said encoded data signal;
sampling said bit of said encoded data signal into a plurality of sampled signals;
inverting a particular number of said plurality of said sampled signals;
adding said sampled signals into an added value;
comparing said added value of said sampled signals to a threshold number; and
generating a decoded signal having a logical value based on said comparing step.

30. The method of claim 28, further comprising the steps of:
encoding a bit of a data signal with a transmission clock value when said bit of said data signal corresponds to a particular logical value; and
encoding said bit of said data signal with an inverse of said transmission clock value when said bit does not correspond to said particular logical value,
wherein said logical value of said decoded signal corresponds to a logical value of said bit of said data signal.

31. The method of claim 28, wherein said added value indicates a confidence level associated with said logical value of said decoded signal.

32. The method of claim 28, wherein said threshold number corresponds to approximately half of a number of signals in said plurality of said sampled signals.

33. A system of decoding a bit of an encoded data signal, comprising the steps of:

means for receiving said bit of said encoded data signal;

means for sampling said bit of said encoded data signal into a plurality of sampled signals;

means for inverting a particular number of said plurality of said sampled signals;

means for adding said sampled signals into an added value;

means for comparing said added value of said sampled signals to a threshold number; and means for generating a decoded signal having a logical value based on said comparing step.

34. The system of claim 32, wherein said added value indicates a confidence level associated with said logical value of said decoded signal.

35. The system of claim 32, further comprising the steps of:

means for encoding a bit of a data signal with a transmission clock value when said bit of said data signal corresponds to a particular logical value; and means for encoding said bit of said data signal with an inverse of said transmission clock value when said bit does not correspond to said particular logical value, wherein said logical value of said decoded signal corresponds to a logical value of said bit of said data signal.

36. The system of claim 32, wherein said threshold number corresponds to approximately half of a number of signals in said plurality of said sampled signals.

* * * * *